E. A. JONES.
ATTACHMENT FOR CORN PLANTERS.
APPLICATION FILED NOV. 13, 1908.
927,858.
Patented July 13, 1909.
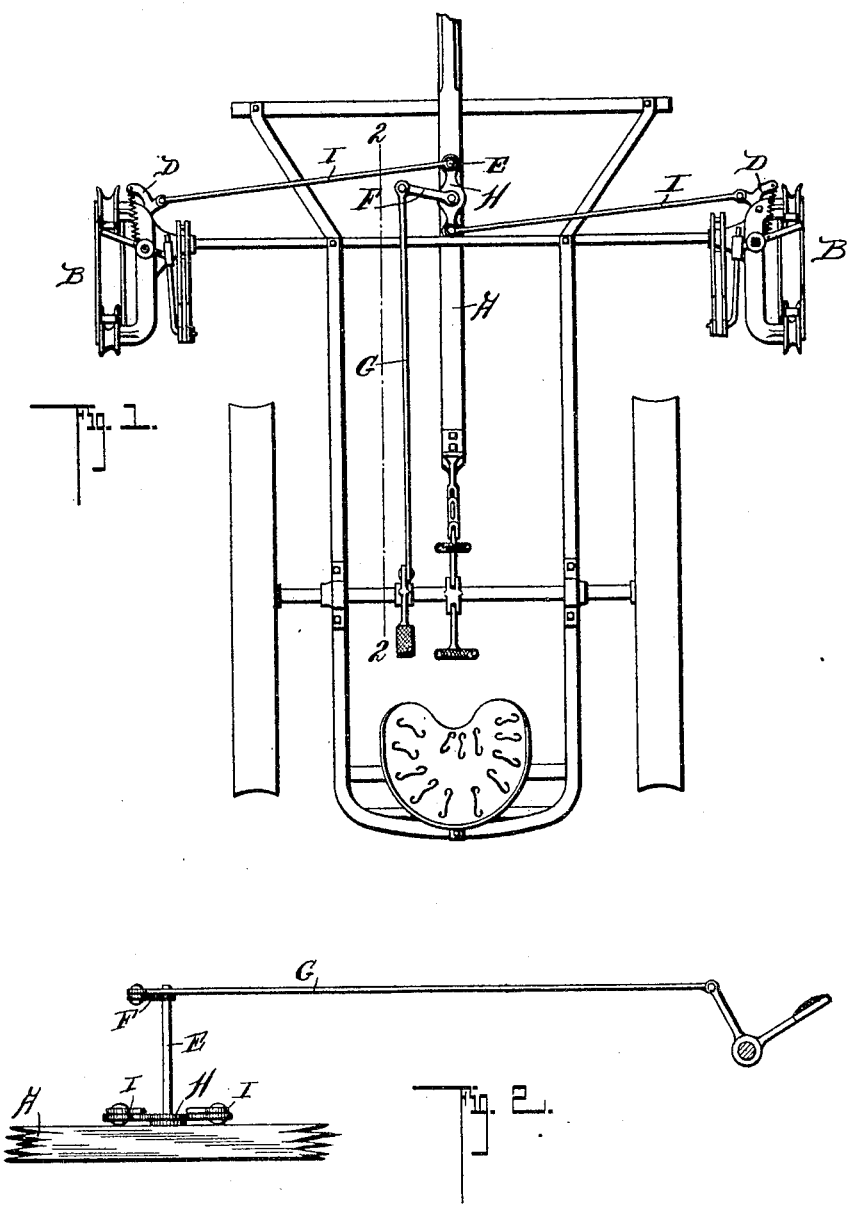

UNITED STATES PATENT OFFICE.

ELIJAH A. JONES, OF BROWNING, MISSOURI.

ATTACHMENT FOR CORN-PLANTERS.

No. 927,858.  Specification of Letters Patent.  Patented July 13, 1909.

Application filed November 13, 1908. Serial No. 462,513.

*To all whom it may concern:*

Be it known that I, ELIJAH A. JONES, a citizen of the United States, residing at Browning, in the county of Linn and State of Missouri, have invented a new and useful Improvement in Attachments for Corn-Planters, of which the following is a specification.

This invention relates to attachments for corn planters and more particularly to check row corn planters, the object being to provide novel means for operating the check row mechanism whereby the wire can be quickly released so that the machine can be turned in order to connect it to the opposite side of the machine.

A further object of the invention is to provide an attachment which is exceedingly simple in construction and one which can be connected to the ordinary check row corn planter now in use dispensing with the use of cables for releasing the check row.

A still further object of the invention is to provide means operated by the foot of the driver for releasing the check row wire.

With these objects in view, my invention consists in the novel features of construction, arrangement and combination of parts hereinafter fully described, pointed out in the claims and shown in the accompanying drawings, in which:—

Figure 1 is a top plan view of my improved attachment, showing it applied to a corn planter. Fig. 2 is a section taken on the line 2—2 of Fig. 1.

Referring to the drawings, A indicates the tongue of a check row corn planter to each side of which is arranged the ordinary check row mechanism B provided with releasing levers D all of which are of the ordinary form now in use.

Mounted on the tongue between the check row mechanism is a vertical crank shaft E to the crank arm of which is connected a rod F which is connected at its free end to a foot lever G mounted in such a position that it can be readily reached by the foot of the driver. Fixed on the crank shaft is a lever H to the ends of which are connected links I the free ends of which are connected to the releasing levers of the check row mechanism. It will be seen that by this arrangement when it is desired to release the wire from the mechanism it is only necessary to press down on the foot lever which will operate the releasing lever of the mechanism so that the wire can be readily detached, in order that it can be placed in the check row mechanism upon the opposite side.

From the foregoing description, it will be seen that I have provided novel means for operating the check row mechanism of a check row corn planter which enables the operator to release the wire from the mechanism by the foot thereby overcoming the difficulties now existing with having to reach down and grab a cable and pull the same. It will also be seen that when the foot lever is operated, both of the releasing levers on the check row mechanism will be opened so that the wire within one of the mechanisms can be readily detached in order that the machine can be turned so as to place the wire in the opposite check row mechanism.

What I claim is:—

1. An attachment for corn planters comprising a shaft provided with a lever, links carried by said lever connected to the releasing levers of the check row mechanism, and means for operating said shaft.

2. In a device of the kind described, the combination with the check row mechanism of a corn planter, of a vertical crank shaft adapted to be mounted on the tongue of the corn planter, a lever fixed on said shaft, links carried by the ends of said lever having their free ends connected to the releasing levers of the check row mechanisms, and a rod connected to the crank arm of said shaft operated by a foot lever, for the purpose described.

ELIJAH A. JONES.

Witnesses:
J. W. JONES,
S. L. GIBSON.